US011522921B1

(12) United States Patent
Gentry et al.

(10) Patent No.: US 11,522,921 B1
(45) Date of Patent: Dec. 6, 2022

(54) CORE NETWORK BYPASS FOR TOLL-FREE CALLING

(71) Applicant: Bandwidth Inc., Raleigh, NC (US)

(72) Inventors: William Gentry, Raleigh, NC (US); Julie Barghouthi, St. Johns, FL (US); Scott Mullen, Holly Springs, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/888,897

(22) Filed: Aug. 16, 2022

(51) Int. Cl.
*H04M 7/00* (2006.01)
*H04L 65/1046* (2022.01)
*H04L 65/1096* (2022.01)
*H04Q 3/00* (2006.01)

(52) U.S. Cl.
CPC ...... *H04L 65/1046* (2013.01); *H04L 65/1096* (2013.01); *H04M 7/0084* (2013.01); *H04Q 3/0025* (2013.01)

(58) Field of Classification Search
CPC ............ H04L 65/1046; H04L 65/1096; H04M 7/0084; H04Q 3/0025
See application file for complete search history.

(56) References Cited

U.S. PATENT DOCUMENTS

| 6,584,190 B1* | 6/2003 | Bressler | H04Q 3/0025 379/230 |
| 2002/0145973 A1* | 10/2002 | Shah | H04L 65/1101 370/220 |
| 2013/0051546 A1* | 2/2013 | Fried | H04M 3/5231 379/265.02 |

* cited by examiner

Primary Examiner — Lakeram Jangbahadur
(74) Attorney, Agent, or Firm — Gregory Stephens

(57) ABSTRACT

Techniques are described for determining when and how to re-route toll-free calls around a core telephony network experiencing significant disruptions. A core telephony network of a telephony service provider is monitored for anomalies. Upon detecting an anomaly, it is determined whether the anomaly is significant enough to warrant re-routing inbound toll-free calls around the core telephony network. The re-routing process comprises accessing an industry registry database including a plurality of toll-free numbers (TFNs) associated with a routing template comprising the instructions for routing toll-free calls. The routing template instructions may be switched to re-direct toll-free calls associated with one or more specific TFNs to a particular carrier. Within that particular carrier, the routing instructions may be switched to re-direct the toll-free calls away from the service provider's core telephony network to a network bypass cloud platform. The network bypass cloud platform may be configured to receive toll-free calls, determine a customer telephony network to which to route the received toll-free calls based on the TFN of the toll-free call, and route the toll-free call to the customer telephony network.

21 Claims, 7 Drawing Sheets

Routing Provisioning

100

300

400

CORE NETWORK BYPASS FOR TOLL-FREE CALLING

TECHNICAL FIELD

Examples described herein are generally related to techniques for bypassing a core telephony network when that network has been compromised to deliver toll-free calls to a customer.

BACKGROUND

Toll-free (TF) calling allows for the called party to pay the fees for completing a call with the calling party. Toll-free is typically utilized by enterprises acting as the called party where the enterprises allow and encourage the general public (calling party) to call them without fear of being charged for making the call. Customer service centers are an example of toll-free use case.

Another characteristic of toll-free calling is the pool of reserved toll-free telephone numbers (TFNs). An enterprise may procure a TFN through a service provider. The service provider is responsible for routing calls to the TFN to the enterprise's telephony network. In normal operating conditions, any call to that TFN will necessarily hit the service provider's core network before being passed to the enterprise's telephony network.

For illustrative purposes, two general scenarios may be used to characterize the service provider's core network regarding call completion for toll-free calling. When everything is operating as it should, it may be characterized as normal calling meaning the service provider core network and all the intermediate networks between the service provider core network and the calling party are running without incident. When the service provider core network is experiencing severe difficulties, it may be characterized as abnormal periods. For example, abnormal periods may be the result of distributed denial of service (DDoS) attacks, equipment failures, carrier outages &/or customer outages, or other one-off type events. During abnormal periods, drastic measures must be taken to re-route toll-free calls to their intended destination to prevent significant service disruption.

What is needed are techniques to allow a telephony service provider to temporarily bypass their core telephony network when it is experiencing significant technical difficulties and still deliver toll-free telephone calls to its customers.

SUMMARY

In one embodiment, techniques are described for determining when and how to re-route toll-free calls around a core telephony network experiencing significant disruptions. The techniques may include a method, a computer system, and/or at least one non-transitory machine-readable medium comprising a set of instructions executable on at least one computing device to cause the at least one computing device to re-route toll-free calls around a core telephony network.

The core telephony network of a telephony service provider may be continuously monitored in real-time for anomalies. When an anomaly is detected, it is determined whether the anomaly is significant enough to warrant initiating a re-routing process configured to re-route inbound toll-free calls around the core telephony network. When the detected anomaly is significant enough to warrant initiating a re-routing process, an industry registry database may be accessed by the telephony service provider that owns the core telephony network currently experiencing significant problems. The industry registry database includes a plurality of toll-free numbers (TFNs), each TFN comprising an NPA-NXX-XXXX format. Each TFN may be further associated with a routing template comprising instructions indicating where to route toll-free calls for the TFN or collection of TFNs allocated to a specific routing template based on the caller's Originating NPA-NXX or LATA. Local access and transport area (LATA) refers to a geographical area of the U.S. assigned to telephone companies to provide communication services. The telephony service provider may then cause the editing of the routing template instructions to re-direct toll-free calls associated with one or more specific TFNs to a particular carrier.

The telephony service provider may then cause the accessing and editing, via a carrier portal, of the carrier's routing instructions for toll-free calls associated with one or more specific TFNs to re-direct the toll-free calls away from the core telephony network to a network bypass cloud platform. The network bypass cloud platform may be configured to receive toll-free calls, determine a customer telephony network to which to route the received toll-free calls based on the TFN of the toll-free call, and route the toll-free call to the customer telephony network.

The customer telephony network, in turn, is configured to receive the toll-free call from the network bypass cloud platform and route the toll-free call to one of a plurality of telephony endpoints.

DETAILED DESCRIPTION

Figure 1:
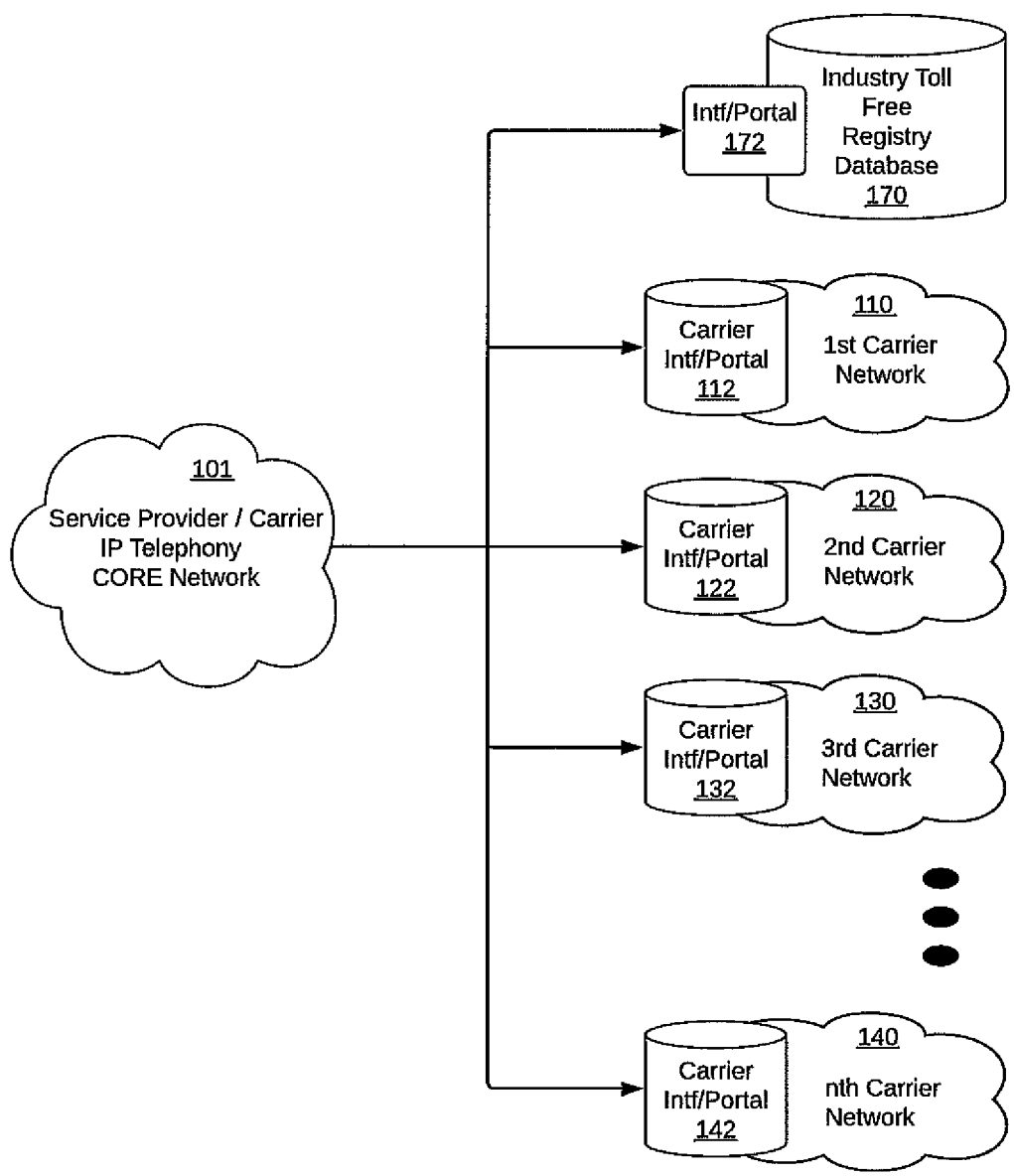
FIG. 1 illustrates a network architecture for registering toll-free telephone numbers and their routing instructions according to an embodiment.

Various embodiments may include a system, method, apparatus, and/or computer program product that describe and claim techniques to route inbound toll-free calls to customers of a service provider when the service provider's network is experiencing significant disruptions.

Toll-free calling refers to a billing system in which the called party assumes the costs for the telephony traffic between the calling and called party. Toll-free calling is typically utilized by enterprises that allow and encourage the general public to call them without fear of being charged for making the call. Customer service centers are an example of a toll-free calling use case. Conference bridges are another example of a toll free calling use case. Another characteristic of toll-free calling are the reserved telephone numbers used. In the United States, Canada, and other countries participating in the North American Numbering Plan, a toll-free telephone number has one of the area codes for current toll-free assignments: 800, 833, 844, 855, 866, 877, and 888. Future Assignments expected based on available toll-free numbering resource utilization will be: 822, 880 through 887, 889, etc. For ease of illustration, toll-free numbers may be referred to herein simply as 800 numbers or 8XX numbers.

Toll-free calling may also be referred to herein as toll-free origination (TFO). In a typical TFO setup, an enterprise will contract with a telephony service provider to obtain one or more toll-free numbers and have telephony traffic intended for the toll-free number(s) routed to the enterprise through the telephony service provider. The telephony service provider may also be a carrier, and/or a RespOrg. For instance, Bandwidth Inc. is both a carrier and RespOrg. The term RespOrg is short for Responsible Organization. It refers to the entity that is the registrar and manages toll-free numbers in the Toll Free Service Management System for North American World Zone 1 toll free numbers. A RespOrg is tasked with registering, porting, implementing routing, and indexing its toll-free numbers in an 800 database.

The techniques described herein allow a toll-free telephony service provider to temporarily bypass their core telephony network when it is experiencing significant technical difficulties and still deliver toll-free telephone calls to its customers.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a network architecture 100 for registering toll-free telephone numbers and their routing instructions according to an embodiment. A telephony service provider 101 providing toll-free services is responsible as a responsible organization (RespOrg) for setting up and publishing the routing instructions associated with each toll-free telephone number it has put into service. This typically involves publishing and/or updating the routing instructions in an industry toll-free registry database 170 such as Somos® via a portal or interface 172. Each active toll-free telephone number may be assigned carrier routing instructions in the Toll Free Service Management System currently provided by Somos that instruct the caller's telephony service provider which carrier partner of RespOrg telephony service provider 101 to route the caller's toll-free call. There may be multiple carrier partners 110, 120, 130, 140 each including a portal interface 112, 122, 132, 142 that allows the RespOrg telephony service provider 101 to provision toll-free routing instructions for the toll-free numbers it has in service. These instructions provide, among other things, the destination gateways and networks for the telephony service provider 101 associated with the toll-free number that was dialed. Access to the Somos routing template 170 via portal/interface 172 and the various carrier portals 112, 122, 132, 142 or APIs are over external secure corporate networks and are independent from production telephony networks.

When the telephony service provider 101 core telephony network is operating normally, the routing instructions remain unchanged. However, during times of significant core telephony network disruption, the telephony service provider 101, using separate external secure access to the Somos routing template and the carrier portals, can update or replace the routing instructions to circumvent the problems. The updated routing instructions may consolidate toll-free traffic to a single carrier partner (e.g., 110) or a subset of carrier partners in the industry toll-free registry database 170 (e.g., Somos). The telephony service provider 101 may then, via a carrier portal 112, amend or replace the specific routing instructions to route away from the core telephony network to a secondary commercial cloud network where that secondary commercial cloud network is configured to route toll-free traffic to the proper customer of telephony service provider 101.

Figure 2:
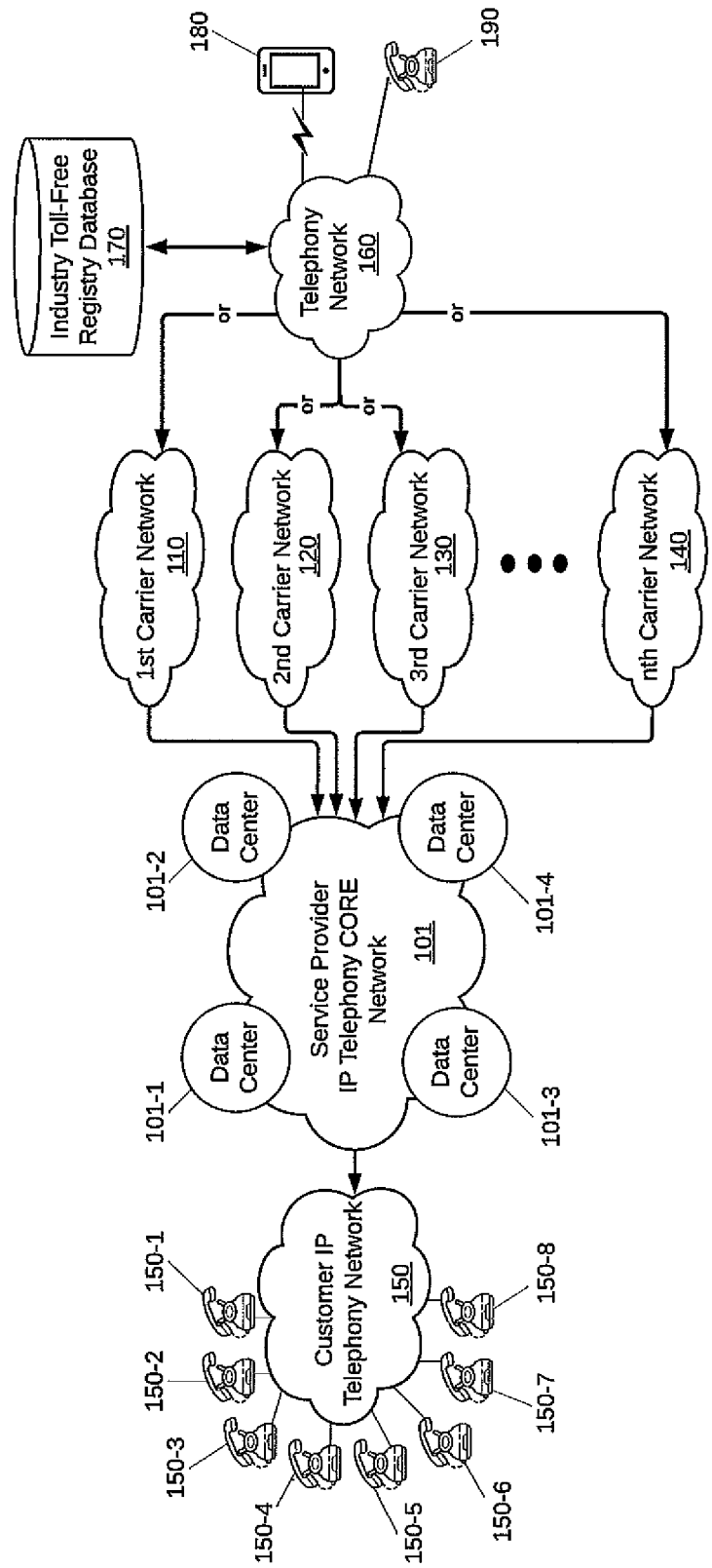
FIG. 2 illustrates a prior art network architecture for handling inbound toll-free calls during normal operating conditions according to an embodiment.

FIG. 2 illustrates a prior art network architecture 100 for handling inbound toll-free calls during normal operating conditions according to an embodiment. When a member of the general public (i.e., caller) places a toll-free call to an 800 number, that call must be routed to its destination. The first step may be for the caller's telephony service provider/network 160 or carrier to consult an industry managed toll-free registry database 170 (e.g., Somos) to determine the routing instructions for the 800 number. The routing instructions may be contained in a template within a database that may be accessed by any telephony network that has received a request to route a toll-free call. For instance, each toll-free number will have a prefix similar to an area code which will be one of 800, 833, 844, 855, 866, 877, and 888 which we will consolidate to "800" for purposes of this description. This prefix may also be referred to as the NPA or number planning area. The next three digits may be referred to as the NXX. NXX may refer to the basic number format used for (exchange) numbers. N means 2-9, while X means 0-9. Therefore, NXX simply means a three-digit number where the first digit cannot be "0" or "1". When it comes to the registry database 170, each TFN may be assigned to a particular carrier meaning that calls to toll-free numbers having a particular TFN are routed to a particular carrier 110, 120, 130, 140.

The caller's telephony service network 160 may then route the toll-free call to one of the carrier(s) 110, 120, 130, 140 specified in the registry database 170 based on the TFN of the called toll-free number. The carrier (e.g., 110) may then consult its own routing templates to determine the service provider that owns or controls that toll-free number. The call may then be routed to that service provider's core telephony network 101 via one of the core telephony network 101 data centers 101-1-101-4. The core telephony network 101 may then determine to which of its customers should receive the call and route the call to that customer's telephony network 150. The customer may then individually route the call to one of its endpoints, 150-1-150-8 for example. When one of the aforementioned endpoints answers the call, the routing is complete.

Figure 3:
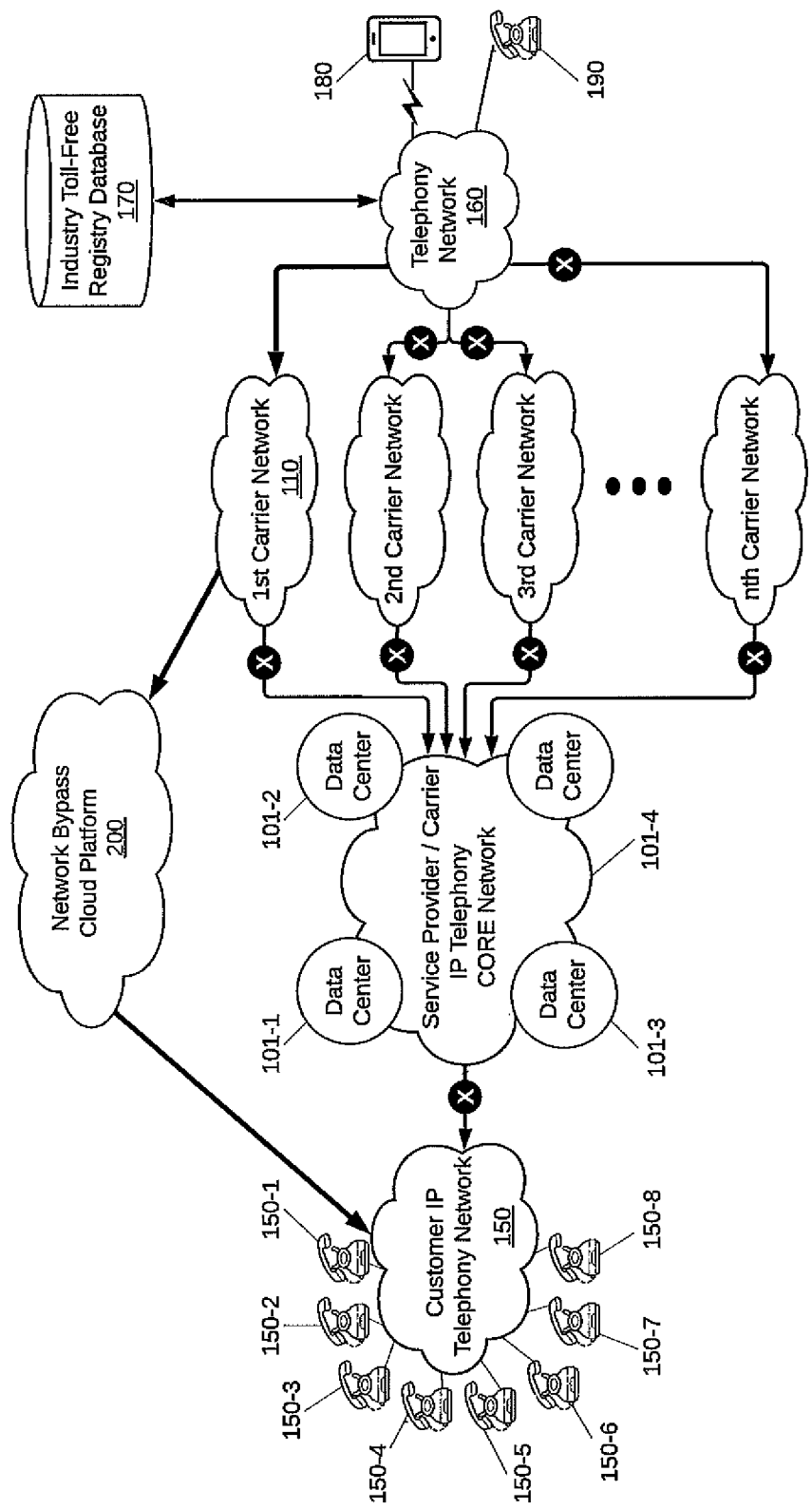
FIG. 3 illustrates a network architecture for handling inbound toll-free calls during abnormal operating conditions according to an embodiment.

FIG. 3 illustrates a network architecture for handling inbound toll-free calls during abnormal operating conditions according to an embodiment. In this scenario, it is assumed that significant problems have been discovered that have caused the service provider's core telephony network 101 to be compromised necessitating routing around the core telephony network 101. Upon discovery of the problems or anomalies, a process of re-writing the template routing instructions in both the industry registry database 170 and the relevant carrier's 110, 120, 130 140 databases is initiated in accordance with the description set out with respect to FIG. 1 above. Once the templates have been amended, the new routing instructions may be employed.

Now, when a caller places a toll-free call to an 800 number, the process may not change but the path the toll-free call takes to its destination may be significantly different. For instance, when the caller's telephony service provider/network 160 consults the industry managed toll-free registry database 170 to determine the routing instructions for the 800 number, those template instructions may now direct toll-free calls having certain TFNs to a single carrier (e.g., 110) or a subset of carrier partners operating without problem. When, for instance, carrier 110 receives the toll-free call from the caller's telephony service provider/network 160, the carrier 110 may then consult its own routing templates to determine the service provider that owns or controls that toll-free number. The service provider controlling the TFN will have provisioned and initiated a fallback position to route around the core telephony network 101 during abnormal operating periods. For example, the TFN may be associated with a primary route for normal operating periods and a secondary route for abnormal operating periods. The primary route will always route the toll-free call to the core telephony network 101 whereas the secondary route may route the toll-free call to a completely separate network bypass cloud platform 200 controlled by the service provider 101 or a trusted third party.

The toll-free call may then be routed to the network bypass cloud platform 200. The network bypass cloud platform 200 may then determine which customer should receive the call and route the toll-free call directly to that customer's telephony network 150. The customer may then individually route the call to one of its endpoints 150-1-150-8, for example. When one of the aforementioned endpoints answers the call, the routing is complete such that the toll-free call avoided the core telephony network 101 and any problems associated therewith.

Figure 4:
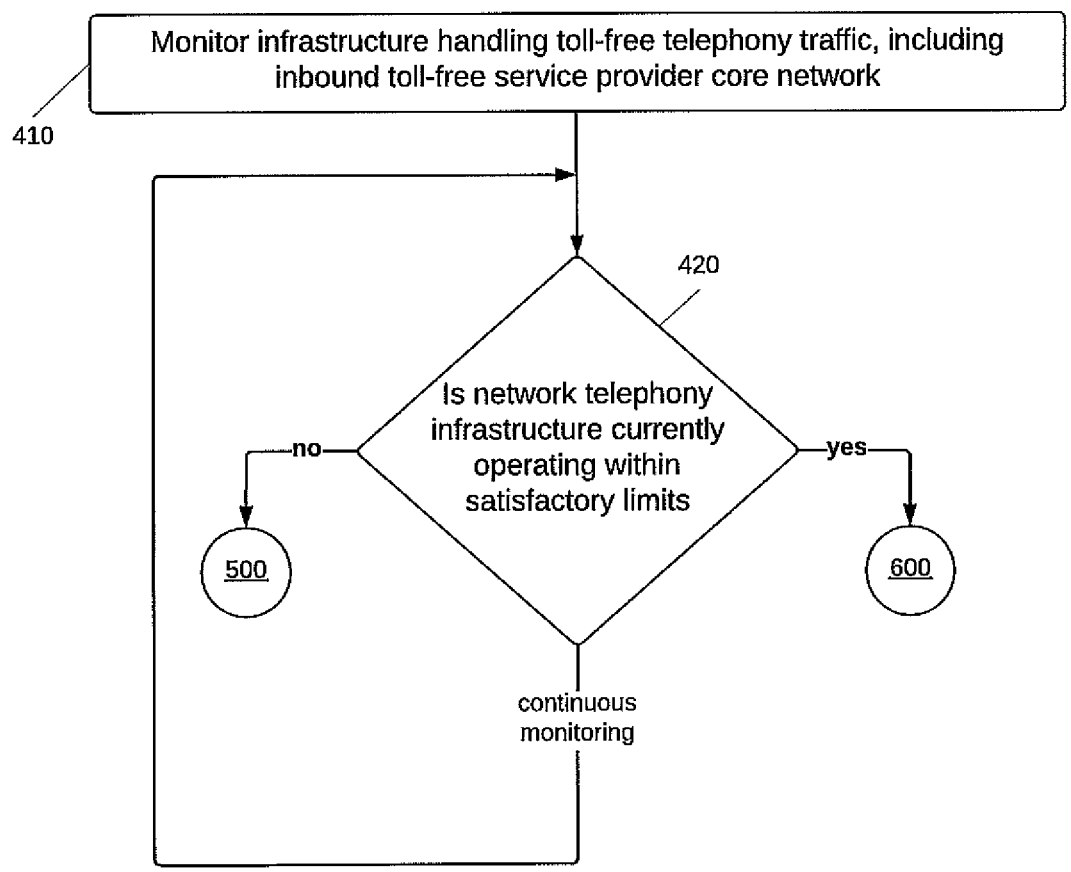
FIG. 4 illustrates a flowchart for monitoring core service provider network conditions according to an embodiment.

FIG. 4 illustrates a flowchart 400 for monitoring core service provider network conditions according to an embodiment. This data flow may be representative of some or all of the operations executed by one or more logic, features, or devices described herein, such as any devices or systems described above with references to other figures herein. The flowchart 400 may comprise one or more steps or processes involved in monitoring core service provider network conditions as described elsewhere herein. The embodiments, however, are not limited to the number, type, order or arrangement of steps shown in FIG. 4.

The core telephony network 101 may be monitored for anomalies on a real-time basis to detect any anomalies that may affect the flow of toll-free calling traffic through the network in step 410.

For example, various points of ingress to the core telephony network 101 may be monitored for unusual traffic that may indicate cyber attacks such as a denial of service (DOS) attack or a distributed denial of service (DDOS) attack. These types of cyber mischief cause inordinate and unwanted traffic to be directed to the IP addresses associated with the core telephony network. This extra unwanted traffic can cause significant delays in processing good traffic. These delays can cause failures in legitimate calling traffic by timing out valid call requests leading to toll-free calls that do not get routed or forwarded to their destinations.

Other types of problems may necessitate routing around the core telephony network 101 too. Prolonged power outages may disrupt the ability of the core telephony network 101 to process traffic in a timely manner. Another example may be a failure or data mis-configuration in the underlying networking servers (e.g., DNS servers) that could have significant impact across multiple regions.

Upon discovery of an anomaly, a determination is made in decision block 420 whether the anomaly is significant enough to materially impact core telephony network 101 operations. If the impact is not significant, there may be no present need to invoke the abnormal routing contingency. In such cases, nothing may be done and control is passed to process 600 for toll-free routing. If the impact is significant, however, the abnormal routing contingency may be invoked. In such cases, control is passed to process 500 (FIG. 5) that is associated with route switching or updating for abnormal operating periods. As mentioned earlier, this monitoring is continuous and may be done autonomously or manually with human intervention.

Figure 5:
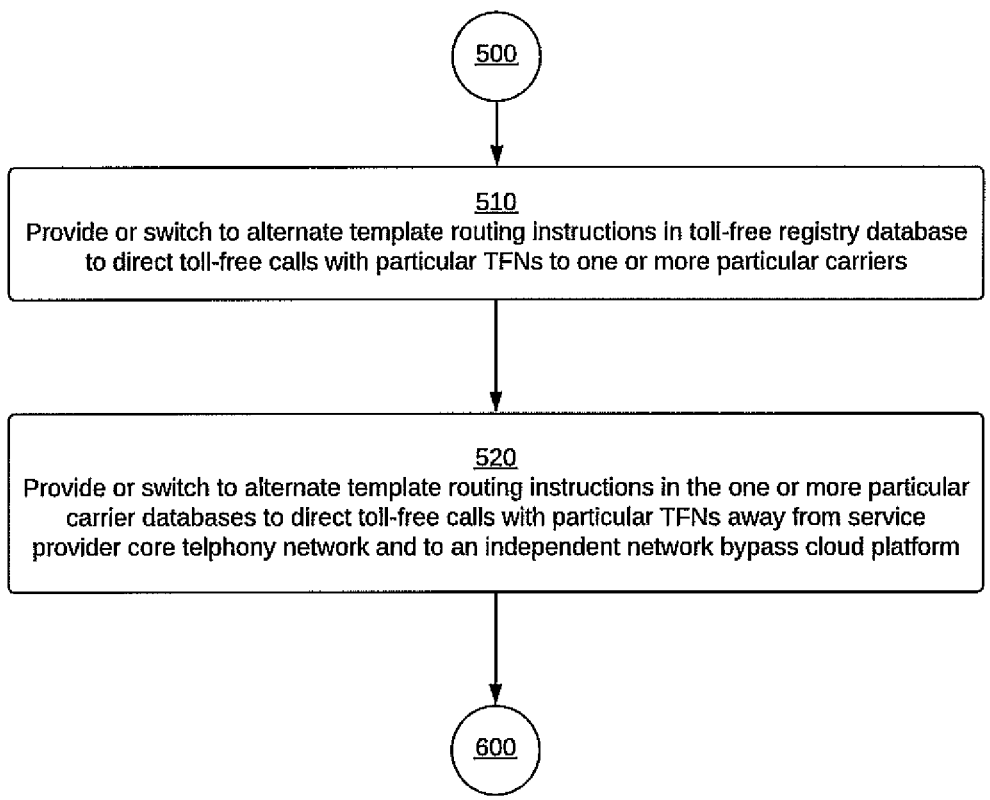
FIG. 5 illustrates a flowchart for re-routing inbound toll-free calls according to an embodiment.

FIG. 5 illustrates a flowchart for updating and/or switching routing instructions for toll-free calls during abnormal operating conditions according to an embodiment. This data flow may be representative of some or all of the operations executed by one or more logic, features, or devices described herein, such as any devices or systems described above with references to other figures herein. The flowchart 500 may comprise one or more steps or processes involved in updating and/or switching routing instructions for toll-free calls during abnormal operating conditions as described elsewhere herein. The embodiments, however, are not limited to the number, type, order or arrangement of steps shown in FIG. 5.

Flowchart 500 illustrates the steps taken to route a toll-free call over the infrastructure diagram of FIG. 3. As previously described, it is assumed that significant problems have been discovered that have caused the service provider's core telephony network 101 to be compromised necessitating routing around the core telephony network 101. The core telephony network 101 may be monitored continuously in real-time to discover problems or anomalies of significance. Should such an anomaly be discovered, an alert may be sent to inform one or more other processes and/or people to the anomaly and whether it is severe enough to warrant the emergency re-routing of toll-free calls. If so, a manual user or automated process may be initiated to access and edit the template routing instructions within the industry registry database 170 at step 510. Access to the template routing instructions within the industry registry database 170 may be achieved, for instance, using a dashboard portal or one or more application programming interfaces (APIs) 172. A dashboard portal 172 may be hosted by the industry registry database 170 and logged into by the various constituents that have records that are stored within the industry registry database 170.

In such cases, the template routing instructions for TFNs that are subscribed or handled by the industry registry database 170 are amended to route to a particular carrier. In addition, a user or automated process may be initiated to access and edit similar template routing instructions within the particular carrier at step 520.

Each carrier may have an access portal or API access like that described above that allows the owners or controllers of TFNs to designate the route the toll-free call to one of the TFNs takes to reach its ultimate destination. The ultimate destination being the customer telephony network 150 that is ordinarily serviced by the core telephony network 101 of the customer's telephony service provider. However, in the abnormal scenario, the customer's telephony service provider causes the carrier routing instructions to change to avoid sending the call to the core telephony network 101.

For example, each TFN may be associated with a primary route for normal periods and a secondary route for abnormal periods. The primary route will always route the toll-free call to the core telephony network 101 whereas the secondary route may route the toll-free call to a completely separate network bypass cloud platform 200 controlled by the service provider or a trusted third party. The changes may be to direct calls to the affected TFNs to the network bypass cloud platform 200 using the secondary route. When a toll-free call is made, it will be routed according to process 600 using the current routes stored by the industry registry database 170 and the designated carriers 110, 120, 130, 140. During abnormal operating periods, the current routes may have just been updated.

Figure 6:
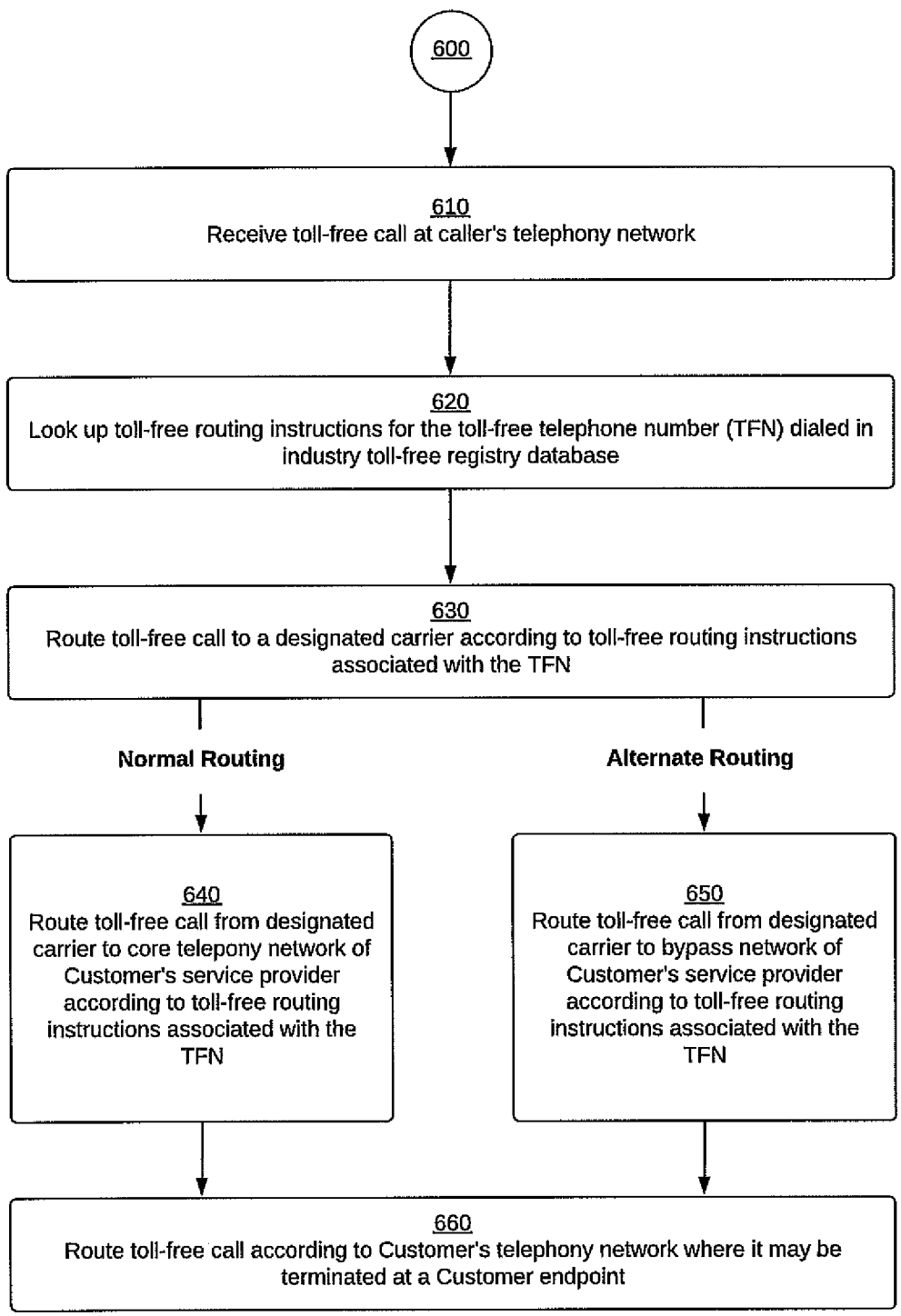
FIG. 6 illustrates a flowchart for processing inbound toll-free calls according to an embodiment.

FIG. 6 illustrates a flowchart 600 for processing and routing toll-free calls according to an embodiment. This data flow may be representative of some or all of the operations executed by one or more logic, features, or devices described herein, such as any devices or systems described above with references to other figures herein. The flowchart 600 may comprise one or more steps or processes involved in processing inbound toll-free calls through the core service provider network during normal operating conditions as described elsewhere herein. The embodiments, however, are not limited to the number, type, order or arrangement of steps shown in FIG. 6.

Flowchart 600 illustrates the steps taken to route a toll-free call over the infrastructure diagram of FIGS. 2 and 3. When a caller places a toll-free call to an 800 number, the caller's telephony service provider/network 160 receives the call at step 610. That telephony service provider/network 160 may consult an industry managed toll-free registry database 170 to determine the routing instructions for the 800 number at step 620. The routing instructions may be contained in a template within a database that may be accessed by any telephony network that has received a request to route a toll-free call. When it comes to the registry database 170, each TFN may be assigned to a particular carrier meaning that calls to toll-free numbers are routed to a particular carrier 110, 120, 130, 140.

The caller's telephony service network 160 may then route the toll-free call to one of the designated carrier(s) 110, 120, 130, 140 specified in the registry database 170 based on a combination of the TFN and the calling party number at step 630. The carrier (e.g., 110) may then consult its own routing templates to determine the service provider that owns or controls that toll-free number.

During normal operating periods, the call may then be normally routed by the designated carrier to that service provider's core telephony network 101 via one of the core telephony network 101 data centers 101-1-101-4 at step 640. The core telephony network 101 may then determine to which of its customers should receive the call and route the call to that customer's telephony network 150 at step 660. The customer may then individually route the call to one of its endpoints, 150-1-150-8, for example. When one of the aforementioned endpoints answers the call, the routing is complete.

During abnormal operating periods, the call may then be alternately routed by the designated carrier to the network bypass cloud platform 200 at step 650. The network bypass cloud platform 200 may then determine to which customer should receive the call and route the call to that customer's telephony network 150 at step 660. The customer may then individually route the call to one of its endpoints, 150-1-150-8, for example. When one of the aforementioned endpoints answers the call, the routing is complete.

There may be one or more variations to the processes described above that provide the ability to selectively re-route subsets of TFNs rather than all TFNs that would normally traverse the core service provide network 101. In some instances, specific parts of the core service provider network 101 may be more affected than other parts. For example, perhaps one data center/point of ingress to the core service provider network 101 is impaired. In such a case, only the toll-free traffic that normally hits the network at that data center may be re-routed such that the other data centers can still operate normally.

In one embodiment, only TFNs that normally route through the affected data center can have their routing template instructions updated according to process 500. Identifying these TFNs may involve a geographic analysis in which TFNs associated with the same geographic market as the data center may be designated for re-routing. This may be achieved by associating a LATA (Local Access and Transport Area) code with each TFN such that the geographic region for each TFN is easily determined. The LATA code is an industry standard that labels a particular geographic market in which calls are routed. Thus, only TFNs with certain LATAs may be designated for re-routing to the network bypass cloud platform 200.

The RespOrg/service provider has the ability to update the routing instructions on a TFN by TFN basis. Should circumstances dictate, subsets of TFNs may be re-routed over the network bypass cloud platform 200 without having to switch or re-route all TFNs.

Figure 7:
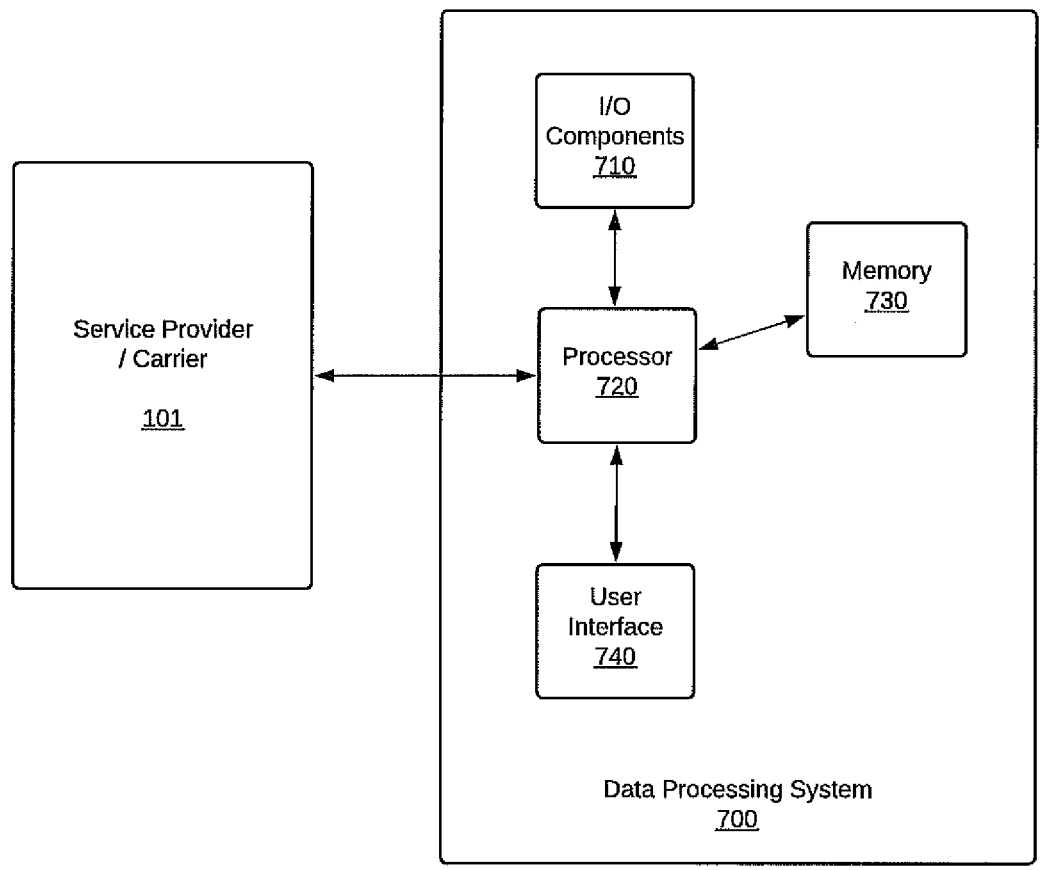
FIG. 7 is a block diagram illustrating an example of a computer based data processing system for use in accordance with some embodiments of the present inventive concept.

Referring now to FIG. 7, a block diagram of an example computer based data processing system 700 suitable for use with any of the embodiments discussed above will be discussed. In some embodiments, the data processing system 700 can be any suitable computing device for performing operations according to the embodiments discussed herein.

As illustrated, the data processing system 700 includes a processor 720 communicatively coupled to I/O components 710, a user interface 740 and a memory 730. The processor 720 can include one or more commercially available processors, embedded processors, secure processors, microprocessors, dual microprocessors, multi-core processors, other multi-processor architectures, another suitable processing device, or any combination of these. The memory 730, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 720.

I/O components 710 may be used to facilitate wired or wireless connections to devices such as one or more displays, game controllers, keyboards, mice, joysticks, cameras, buttons, speakers, microphones and/or other hardware used to input or output data. Memory 730 represents non-volatile storages such as magnetic, optical, or other storage media included in the data processing system and/or coupled to processor 720.

The user interface 740 may include, for example, a keyboard, keypad, touchpad, voice activation circuit, display or the like and the processor 720 may execute program code or instructions stored in memory 730.

It should be appreciated that data processing system 700 may also include additional processors, additional storage, and a computer-readable medium (not shown). The processor(s) 720 may execute additional computer-executable program instructions stored in memory 730. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method, comprising;
   monitoring a core telephony network of a first telephony service provider for anomalies, the anomalies causing a failure or a delay of a telephone call routing;
   upon detecting an anomaly, determining whether the anomaly has caused a service disruption to the core telephony network to warrant initiating a re-routing process configured to re-route inbound toll-free calls to one or more toll-free numbers (TFNs) away from the core telephony network to a network bypass cloud platform; and
   when the detected anomaly has caused the service disruption to the core telephony network to warrant initiating the re-routing process:
   accessing an industry registry database, the industry registry database including a plurality of TFNs, each TFN associated with a routing template, the routing template for each TFN comprising network carrier routing instructions for routing toll-free calls to a designated network carrier;
   switching the network carrier routing instructions to re-direct toll-free calls associated with a TFN from the designated network carrier to an alternate network carrier, the alternate network carrier including toll-free routing instructions for the TFN;
   switching the toll-free routing instructions within the alternate network carrier to re-direct toll-free calls to the TFN away from the core telephony network to the network bypass cloud platform, the network bypass cloud platform configured to:
   receive toll-free calls;
   determine a customer telephony network to which to route the received toll-free calls based on the TFN of the toll-free call; and
   route the toll-free call to the customer telephony network, wherein the customer telephony network is configured to receive the toll-free call from the network bypass cloud platform and route the toll-free call to one of a plurality of telephony endpoints.

2. The method of claim 1, wherein the routing instructions within the particular network carrier are accessed and edited using a network carrier dashboard portal interface.

3. The method of claim 1, wherein the routing instructions within the particular network carrier are accessed and edited using one or more application programming interfaces (APIs).

4. The method of claim 1, wherein the industry registry database is accessed and edited using a dashboard portal interface.

5. The method of claim 1, wherein the industry registry database is accessed and edited using one or more application programming interfaces (APIs).

6. The method of claim 1, the monitoring of the core telephony network being continuous real-time monitoring.

7. The method of claim 1, wherein each TFN is further associated with a local access and transport area (LATA) code, further comprising:
   selecting one or more TFNs to be re-routed based on the LATA code.

8. A computer system, comprising:
   one or more processors spread across one or more computers; and
   a non-transitory computer readable medium to store a set of instructions executable by the one or more processors spread across one or more computers, the set of instructions to cause the one or more processors to:
   monitor a core telephony network of a first telephony service provider for anomalies, the anomalies causing a failure or a delay of a telephone call routing;
   upon detecting an anomaly, determine whether the anomaly has caused a service disruption to the core telephony network to warrant initiating a re-routing process configured to re-route inbound toll-free calls to one or more toll-free numbers (TFNs) away from the core telephony network to a network bypass cloud platform; and
   when the detected anomaly has caused the service disruption to the core telephony network to warrant initiating the re-routing process:
   access an industry registry database, the industry registry database including a plurality of TFNs, each TFN associated with a routing template, the routing template for each TFN comprising network carrier routing instructions for routing toll-free calls to a designated network carrier;
   switch the network carrier routing instructions to re-direct toll-free calls associated with a TFN from its designated network carrier to an alternate network carrier, the alternate network carrier including toll-free routing instructions for the TFN;
   switch the toll-free routing instructions within the alternate network carrier to re-direct toll-free calls to the TFN away from the core telephony network to the network bypass cloud platform, the network bypass cloud platform configured to:
   receive toll-free calls;
   determine a customer telephony network to which to route the received toll-free calls based on the TFN of the toll-free call; and
   route the toll-free call to the customer telephony network, wherein the customer telephony network is configured to receive the toll-free call from the network bypass cloud platform and route the toll-free call to one of a plurality of telephony endpoints.

9. The computer system of claim 8, wherein the routing instructions within the particular network carrier are accessed and edited using a network carrier dashboard portal interface.

10. The computer system of claim 8, wherein the routing instructions within the particular network carrier are accessed and edited using one or more application programming interfaces (APIs).

11. The computer system of claim 8, wherein the industry registry database is accessed and edited using a dashboard portal interface.

12. The computer system of claim 8, wherein the industry registry database is accessed and edited using one or more application programming interfaces (APIs).

13. The computer system of claim 8, the monitoring of the core telephony network being continuous real-time monitoring.

14. The computer system of claim 8, wherein each TFN is further associated with a local access and transport area (LATA) code, the set of instructions to cause the one or more processors to:
  select one or more TFNs to be re-routed based on the LATA code.

15. At least one non-transitory machine-readable medium comprising a set of instructions executable on at least one computing device to cause the at least one computing device to re-route toll-free calls around a core telephony network, the set of instructions to:
  monitor a core telephony network of a first telephony service provider for anomalies, the anomalies causing a failure or a delay of a telephone call routing;
  upon detecting an anomaly, determine whether the anomaly has caused a service disruption to the core telephony network to warrant initiating a re-routing process configured to re-route inbound toll-free calls to one or more toll-free numbers (TFNs) away from the core telephony network to a network bypass cloud platform; and
  when the detected anomaly has caused the service disruption to the core telephony network to warrant initiating the re-routing process:
    access an industry registry database, the industry registry database including a plurality of TFNs, each TFN associated with a routing template, the routing template for each TFN comprising network carrier routing instructions for routing toll-free calls to a designated network carrier;
    switch the network carrier routing instructions to re-direct toll-free calls associated with a TFN from its designated network carrier to an alternate network carrier, the alternate network carrier including toll-free routing instructions for the TFN;
    switch the toll-free routing instructions within the alternate network carrier to re-direct toll-free calls to the TFN away from the core telephony network to the network bypass cloud platform, the network bypass cloud platform configured to:
      receive toll-free calls;
      determine a customer telephony network to which to route the received toll-free calls based on the TFN of the toll-free call; and
      route the toll-free call to the customer telephony network, wherein the customer telephony network is configured to receive the toll-free call from the network bypass cloud platform and route the toll-free call to one of a plurality of telephony endpoints.

16. The non-transitory machine-readable medium of claim 15, wherein the routing instructions within the particular network carrier are accessed and edited using a network carrier dashboard portal interface.

17. The non-transitory machine-readable medium of claim 15, wherein the routing instructions within the particular network carrier are accessed and edited using one or more application programming interfaces (APIs).

18. The non-transitory machine-readable medium of claim 15, wherein the industry registry database is accessed and edited using a dashboard portal interface.

19. The non-transitory machine-readable medium of claim 15, wherein the industry registry database is accessed and edited using one or more application programming interfaces (APIs).

20. The non-transitory machine-readable medium of claim 15, the monitoring of the core telephony network being continuous real-time monitoring.

21. The non-transitory machine-readable medium of claim 15, wherein each TFN is further associated with a local access and transport area (LATA) code, the set of instructions to:
  select one or more TFNs to be re-routed based on the LATA code.

* * * * *